(12) United States Patent
Moen et al.

(10) Patent No.: US 10,364,916 B2
(45) Date of Patent: Jul. 30, 2019

(54) DEPLOYMENT AND DIRECT TIE-IN OF SUBSEA PIPELINES

(71) Applicant: Statoil Petroleum AS, Stavanger (NO)

(72) Inventors: Johan K. Moen, Stavanger (NO); Geir Endal, Stavanger (NO); Rolf Morten Nes, Stavanger (NO); Ståle Størkersen, Stavanger (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 15/300,607

(22) PCT Filed: Mar. 31, 2014

(86) PCT No.: PCT/EP2014/056477
§ 371 (c)(1),
(2) Date: Sep. 29, 2016

(87) PCT Pub. No.: WO2015/149843
PCT Pub. Date: Oct. 8, 2015

(65) Prior Publication Data
US 2017/0108143 A1    Apr. 20, 2017

(51) Int. Cl.
*F16L 1/26* (2006.01)
*F16L 1/16* (2006.01)
*F16L 1/24* (2006.01)
*E21B 43/013* (2006.01)

(52) U.S. Cl.
CPC ............ *F16L 1/26* (2013.01); *E21B 43/0135* (2013.01); *F16L 1/16* (2013.01); *F16L 1/24* (2013.01)

(58) Field of Classification Search
None
See application file for complete search history.

(56) References Cited

U.S. PATENT DOCUMENTS

| 3,378,066 A | | 4/1968 | Otteman et al. |
| 3,434,296 A | * | 3/1969 | Geer .................. E21B 43/0107 166/343 |

(Continued)

FOREIGN PATENT DOCUMENTS

| GB | 2477780 A | 8/2011 |
| RU | 2229053 C2 | 5/2004 |

(Continued)

OTHER PUBLICATIONS

Russian Office Action and Search Report for Russian Application No. 2016141842/06, dated Apr. 27, 2018, with an English translation of the Office Action.

(Continued)

*Primary Examiner* — Matthew R Buck
*Assistant Examiner* — Douglas S Wood
(74) *Attorney, Agent, or Firm* — Birch, Stweart, Kolasch & Birch, LLP

(57) ABSTRACT

A method of installing a subsea pipeline having a direct tie-in to a subsea structure includes, during introduction of the pipeline into the sea from a pipe laying vessel, applying a plastic deformation to a region of the pipeline at or close to an end of the pipeline to be tied-in and, either during or following tie-in, elastically deforming the region to increase its radius of curvature.

9 Claims, 6 Drawing Sheets

(56) References Cited

U.S. PATENT DOCUMENTS

| | | | |
|---|---|---|---|
| 3,965,713 A * | 6/1976 | Horton | B21C 47/22 |
| | | | 242/159 |
| 5,437,518 A | 8/1995 | Maloberti et al. | |
| 6,234,717 B1 * | 5/2001 | Corbetta | E21B 41/04 |
| | | | 405/158 |
| 2007/0081862 A1 * | 4/2007 | Wolbers | E21B 17/012 |
| | | | 405/169 |
| 2010/0040417 A1 * | 2/2010 | Bursaux | F16L 1/203 |
| | | | 405/166 |

FOREIGN PATENT DOCUMENTS

| | | |
|---|---|---|
| SU | 1161771 A1 | 6/1985 |
| WO | WO 02/057674 A1 | 7/2002 |

OTHER PUBLICATIONS

Russian Search Report dated Apr. 25, 2018 for Russian Application No. 2016141842/06.

* cited by examiner

S1. During introduction of the pipeline into the sea from a pipe laying vessel, apply a plastic deformation to a region of the pipeline at or close to an end of the pipeline to be tied-in S2. Either during or following tie-in, elastically deform said region to increase its radius of curvature

Figure 10

DEPLOYMENT AND DIRECT TIE-IN OF SUBSEA PIPELINES

TECHNICAL FIELD

The present invention relates the deployment and direct tie-in of subsea pipelines used for the transportation of hydrocarbons.

BACKGROUND

Pipelines for the transport of hydrocarbons, e.g. oil or gas, are typically laid along the seabed using a laying vessel. Such subsea pipelines can be installed between, for example, two subsea structures, where the subsea structures may be "christmas trees", riser bases, Blowout Preventers (BOPs), or some other structures. Often one or both ends of the pipeline are connected (or "tied-in") to a subsea structure using a separate jumper or spool. The extra components and procedures associated with the use of separate jumpers or spools result in high costs for the installation process. Direct tie-in methods can also be used and are often preferable. These methods include:
- direct pull-in (FIG. 1), in which an end of the pipeline is pulled close to the subsea structure using a winch location on the laying vessel, and the tie-in is completed using a remotely operated vehicle (ROV) and alignment apparatus;
- deflect to connect (FIG. 2), in which a wire is attached to the end of the pipeline, where the wire is routed through the subsea structure to a winch, and the wire is used to pull the subsea end of the pipeline directly to the subsea structure; and
- connect and lay-away (FIGS. 3 and 4), in which the subsea end of the pipeline is connected to the subsea structure at the surface, and the subsea structure is then lowered to the seabed before the laying vessel lays the pipeline by stepping away from the subsea structure.

A typical approach to pipelaying will involve careful design of the subsea structure and of the pipeline configuration in order to ensure that, when laid, the tie-in end of the pipeline is in the correct location and orientation with respect to the connector on the subsea structure. During the direct tie-in process, a very high tensile force is applied to the end of the pipeline, putting the pipeline under tension, in order to bring the end of the pipeline up to the connection point and complete the tie-in process. One of the reasons to put the installed pipe under tension is in order to allow for subsequent thermal expansion of the pipe that can occur during use. Without such tension, a pipeline may buckle as a result of the thermal expansion.

The forces applied to the pipeline during direct tie-in can be very high indeed. This makes high demands of the installation equipment and pipeline structure. Furthermore, at least in the absence of some compensating mechanism, the forces can cause damage to the pipeline and to the connector on the subsea structure.

SUMMARY

It is an object of the present invention to overcome or at least mitigate the disadvantages of known direct tie-in procedures. In particular, it is an object of the invention to allow the direct tie-in of a subsea end of a pipeline while minimising the forces on the connection between the pipeline and a subsea structure, minimising the forces required during the direct tie-in process, minimising the stresses on a deflected section of the pipeline near its subsea end, and minimising the area around the subsea structure required to accommodate the deflection of the pipeline.

According to a first aspect of the invention there is provided a method of installing a subsea pipeline having a direct tie-in to a subsea structure. The method comprises, during introduction of the pipeline into the sea from a pipe laying vessel, applying a plastic deformation to a region of the pipeline at or close to an end of the pipeline to be tied-in and, either during or following tie-in, elastically deforming said region to increase its radius of curvature.

As an option, said region may be located within 200 m, and more preferably 100 m, of the tie in end of the pipeline.

As an option, the method may comprise laying the tie-in end of the pipeline on or close to the seabed and pulling the tie-in end towards the subsea structure, said action of pulling resulting in the elastic deformation of said region. Said step of pulling may be achieved using a winch having a winch cable attached to said tie-in end and passing through the subsea structure. Alternatively, said step of pulling may be achieved using a winch having a winch cable extending from the laying vessel or a support vessel and being directly connected to said tie-in end.

As an option, the method may comprise performing said tie-in at the surface, lowering the tie-in end of the pipeline and the subsea structure to the seabed, performing further laying of the pipeline including pulling the pipeline to cause elastic deformation of said region.

As an option, the method may comprise attaching weights and/or buoyancy devices at or close to the tie-in end of the pipeline in order to control the orientation and location of the pipeline.

As an option, the step of applying a plastic deformation to a region of the pipeline at or close to an end of the pipeline to be tied-in may comprise establishing a residual curvature strain of between 0.2% to 0.3%.

As an option, said pipeline may be a steel pipeline.

BRIEF DESCRIPTION OF THE DRAWINGS

FIG. 10 is a flow diagram further illustrating a procedure for the direct tie-in of a pipeline with a tie-in and thermal expansion loop.

DETAILED DESCRIPTION

Figure 1:
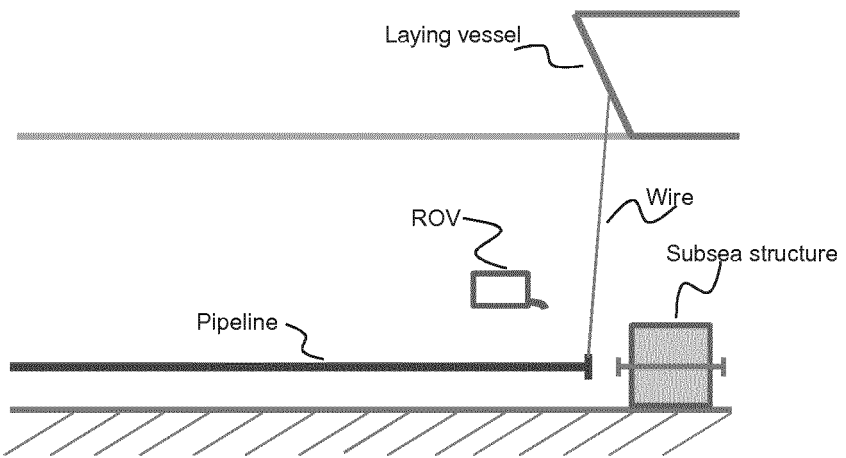
FIG. 1 illustrates schematically a direct pull-in direct tie-in procedure.

As described above, a pipeline to be laid on the seabed may be transported on and deployed from a laying vessel. In the case that a substantially inflexible pipeline (for example, steel) is stored on a reel on the laying vessel, it is typically necessary to straighten the pipeline as it is deployed, to remove any residual curvature produced by storing the pipeline on the reel or bending it over the stinger. This is achieved using curvature means that plastically deforms the pipeline to remove the residual curvature.

As described has also been described above, the installation of such straightened pipelines using direct tie-in methods can result in large forces during and following the completion of the connection between an end of a pipeline and a subsea structure, and large stresses in the section of the pipeline near the end of the pipeline. Furthermore, a large area is required for routing the pipeline to the subsea structure, to accommodate the lateral deflection of the pipeline required to align the end of the pipeline with a connection point on the subsea structure. The approach presented here mitigates these problems by using the method of WO02/057674 to create a radius of curvature in a section of the pipeline adjacent to the subsea end of the pipeline (creating a "tie-in and thermal expansion loop").

In operation, a pipeline will expand under the high pressures and temperatures that can be associated with the transport of, for example, oil or gas. In the case of a generally straight configuration between, for example, two subsea structures that are fixed on the seabed, such thermal expansion (which will result in an increased pipeline length) will result in compressive forces on the pipeline. These compressive forces may be significant and, in the absence of some control mechanism, can cause the pipeline to buckle at unpredictable locations, resulting in the deformation and possible collapse of the pipeline in the horizontal or vertical plane.

In conventional installation methods the pipeline is placed under tension as it is deployed from the laying vessel, due to both the weight of the pipe itself and the forward motion of the laying vessel. This tensile force results in an axial elastic extension in the pipeline, and because the pipeline does not regain its original length before the installation process is complete, the installed pipeline remains under tension. This pre-existing tension in the pipeline mitigates the effects of the longitudinal expansion in the operational pipeline; however, the resulting compression forces may still be large enough to cause buckling. Further measures that are commonly used to protect against the buckling of a pipeline include burying the pipeline in a trench or placing it in an open trench, covering the pipeline with gravel, laying the pipeline along a snaked route, laying the pipeline in a larger casing, and including expansion loops in the pipeline along its length. These methods may be expensive, and may leave uncertainty regarding the likelihood and possible location of buckling in the pipeline.

Figure 5:
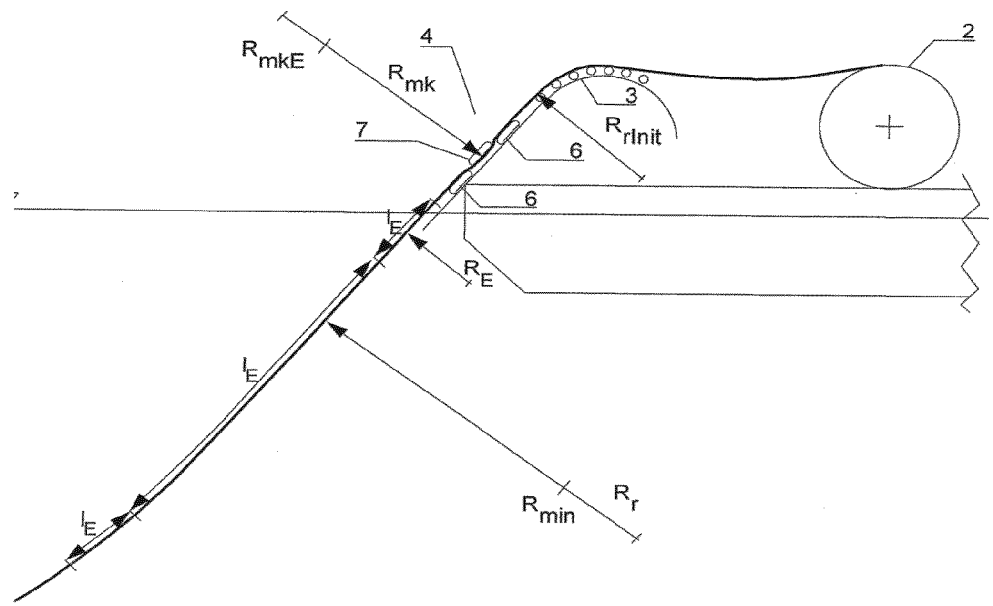
FIG. 5 illustrates schematically a prior art method for creating thermal expansion loops in a pipeline using curvature means located on a laying vessel.

WO02/057674 aims to mitigate these problems by providing a method for laying a pipeline on the sea bed and that allows for controlled thermal expansion, using thermal expansion loops. This method is illustrated in FIG. 5 which shows a laying vessel and associated laying apparatus. The procedure involves feeding out the pipeline 1 having a radius of initial residual curvature RrInit from a pipeline reel 2, preferably via a stinger 3, to a curvature means 4 where a radius of reverse curvature Rmk is applied to the opposite side of the pipeline with respect to the radius of initial residual curvature RrInit. The curvature means 4 straightens out the pipeline to longer, mainly straight portions having a radius of residual curvature Rr which is larger than some desired minimum radius of residual curvature RrMin. The curvature means 4 exposes shorter portions of the pipeline 1 having a length IE to a radius of counter curvature RmkE which is less than a desired maximum radius of residual curvature REMax. These short lengths with decreased radius of curvature RmkE provide thermal expansion loops in the deployed pipeline. The result of this method is that, during thermal expansion, deflection occurs in a controlled manner at the regions of pre-existing curvature.

The method of WO02/057674 is adapted here to create a tie-in and thermal expansion loop in the section of the pipeline adjacent to the tie-in end of the pipeline.

Figure 6:
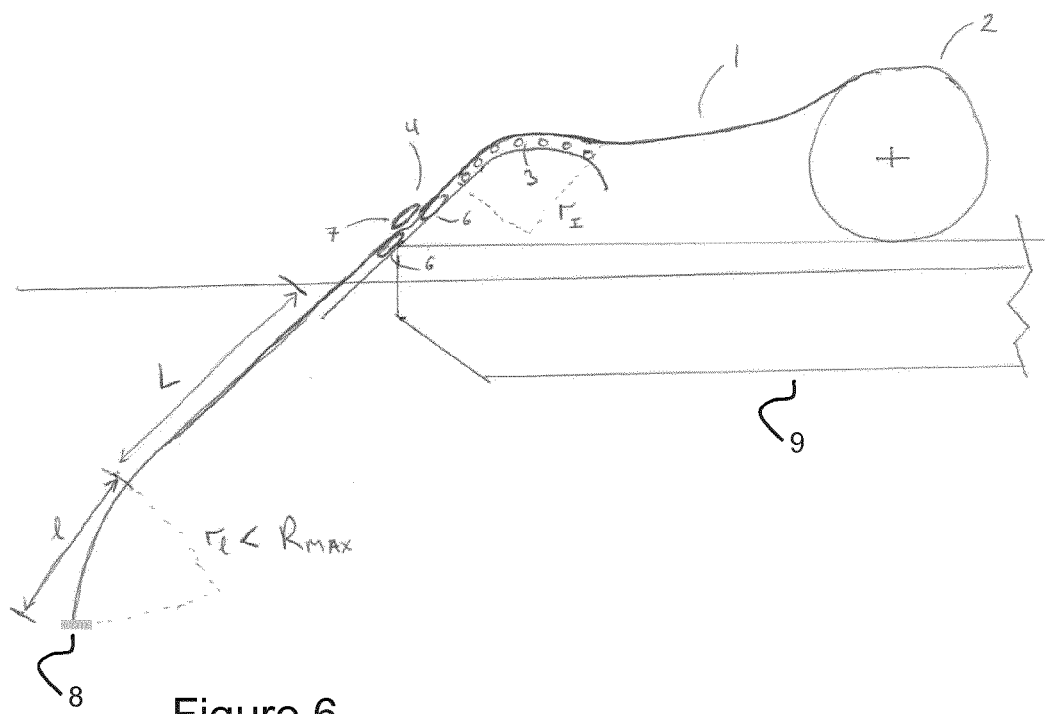
FIG. 6 illustrates schematically a method according to the invention for creating a tie-in and thermal expansion loop in a section of the pipeline adjacent to an end of the pipeline using curvature means located on a laying vessel.

FIG. 6 illustrates a laying vessel 9 that is in the process of deploying a pipeline 1 from a pipeline reel 2. The pipeline 1 is bent over a stinger 3 as it is deployed from the pipeline reel 2. For large sections of pipeline 1 (indicated by length L) the curvature means 6, 7 is used to remove the residual radius of curvature that results from the storage of the pipeline 1 on the pipeline reel 2 and its bending over the stinger 3. To produce a radius of curvature $r_l$ in a section of the pipeline ⌊ adjacent to the end of the pipeline 8, the curvature means 7 is adjusted so that a smaller amount of curvature is applied to the opposite side of the pipeline (i.e. the side that shows convex curvature after deployment from the reel and bending over the stringer). In this way, less of the residual curvature produced by the storage on the reel and the bending over the stringer is removed, leaving a radius of curvature in the section of the pipeline section ⌊ adjacent to the end of the pipeline that is smaller than a predetermined maximum radius of curvature. This creates a tie-in and thermal expansion loop, at the tie-in end of the pipeline. In a subsequent length of the pipeline L, a radius of curvature greater than a predetermined minimum radius of curvature is produced. In effect, this radius may be infinite, resulting in a completely straightened pipeline section. Subsequent lengths of the pipeline may include thermal expansion loops according to WO02/057674.

In an embodiment of the invention the end of the pipeline—including the tie-in and thermal expansion loop—is directly connected to the subsea structure using a direct pull-in direct tie-in method, as illustrated schematically in FIG. 1. In this case the end of the pipeline is pulled close to the subsea structure using, for example, a wire or cable extending from a laying vessel. When the end of the pipeline is close enough to the subsea structure, the final stages of the direct tie-in process are completed using a remotely operated vehicle (ROV).

Figure 2:
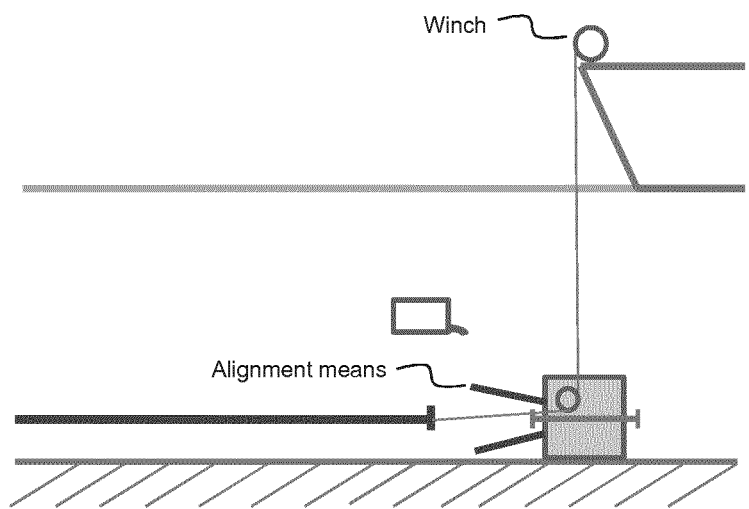
FIG. 2 illustrates schematically a deflect-to-connect direct tie-in procedure.

In another embodiment of the invention the end of the pipeline is directly connected to the subsea structure using a deflect-to-connect direct tie-in method, as illustrated schematically in FIG. 2. In this case a wire is attached to the subsea end of the pipeline, and this wire is routed through the subsea structure to a winch located on, for example, a floating offshore platform or vessel. The winch reels in the wire, thus pulling the end of the pipeline close to the subsea structure. Alignment means installed on the subsea structure guide the end of the pipeline to the connection point on the subsea structure, and the final connection steps can be carried out using an ROV.

Figure 3:
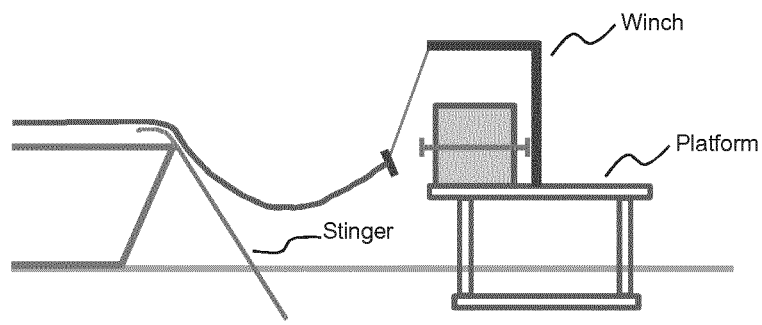
FIGS. 3 and 4 illustrate schematically a connect and lay-away direct tie-in procedure.
Figure 4:
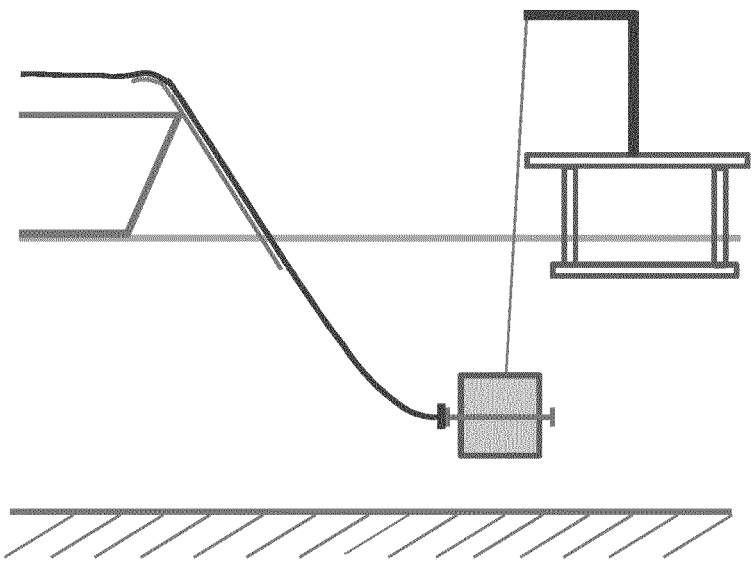

In another embodiment of the invention the end of the pipeline is directly connected to the subsea structure using a connect and lay-away direct tie-in method, as illustrated schematically in FIGS. 3 and 4. In this case, the end of the pipeline incorporating the tie-in and thermal expansion loop is connected to a cable or wire extending from a winch on, for example, a floating offshore platform; this is carried out before the end of the pipeline is lowered into the sea. The subsea structure is located on the floating offshore platform, and after the end of the pipeline is pulled to the floating offshore platform using the winch, the end of the pipeline is directly connected to the subsea structure while it is still located on the floating offshore platform. The subsea structure is then lowered to the seabed using the winch and the laying vessel steps away from the floating offshore platform, deploying and laying the pipeline as it goes.

Figure 7:
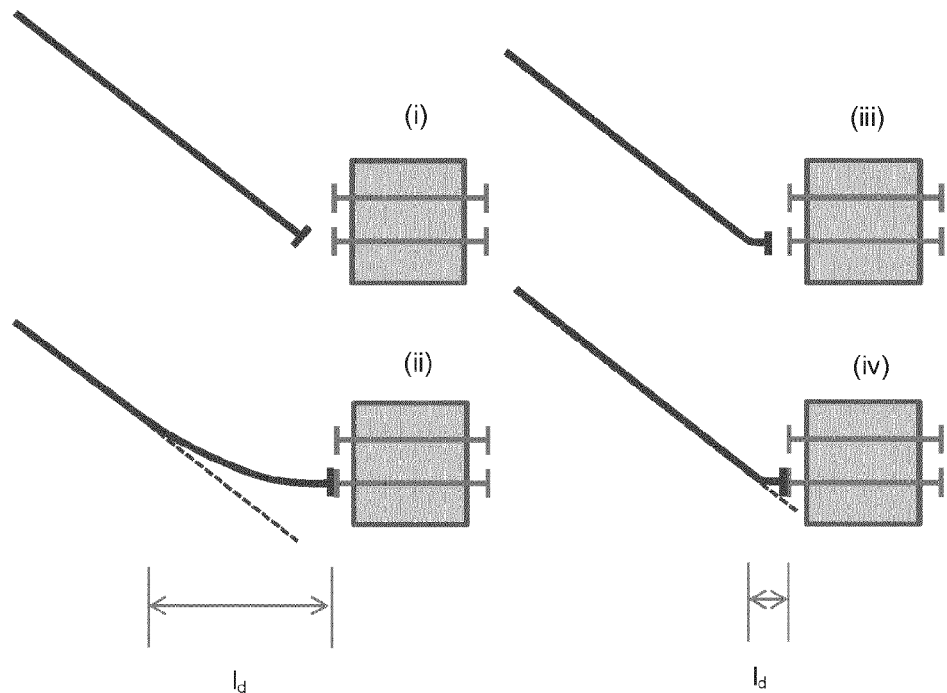
FIG. 7 is a schematic plan view of the direct tie-in installation of a pipeline with no tie-in and thermal expansion loop ((i) and (ii)), and with a tie-in and thermal expansion loop ((iii) and (iv)), and illustrates schematically the large area around the subsea structure that is required to accommodate the lateral deflection of the pipeline in (ii), compared with (iv)

FIG. 7 illustrates the difference between the configurations of unconnected and directly connected pipelines with and without a tie-in and thermal expansion loop in the section of the pipeline adjacent to the end of the pipeline. FIG. 7(i) shows a plan view of a conventional, substantially straight pipeline before it has been connected to a subsea structure. The connection surface of the end of the pipeline in FIG. 7(i) is not parallel to the connection surface on the subsea structure, and the pipeline must therefore be deflected away from its unstressed straight conformation to facilitate the connection with the subsea structure. This requires the application of large forces during the tie-in process, and produces stresses in the section of the pipeline near to the connection with the subsea structure. To minimise the forces required during the tie-in process and the stresses in the section of the pipeline near to the connection with the subsea structure, the bending radius of the section of the pipeline near to the connection with the subsea structure must be maximised. As illlustrated schematically in FIG. 7(ii) by the length $I_d$, a large area around the subsea structure is therefore required to accommodate the lateral deflection of the pipeline. FIG. 7(iii) and (iv) shows plan views of a pipeline with a tie-in and thermal expansion loop before and after connection with a subsea structure. The tie-in and thermal expansion loop minimises the forces required during the tie-in process and the stresses on the section of the pipeline adjacent to the end of the pipeline, and reduces the area around the subsea structure required to accommodate the lateral deflection of the pipeline (FIG. 7(iv)).

Figure 8:
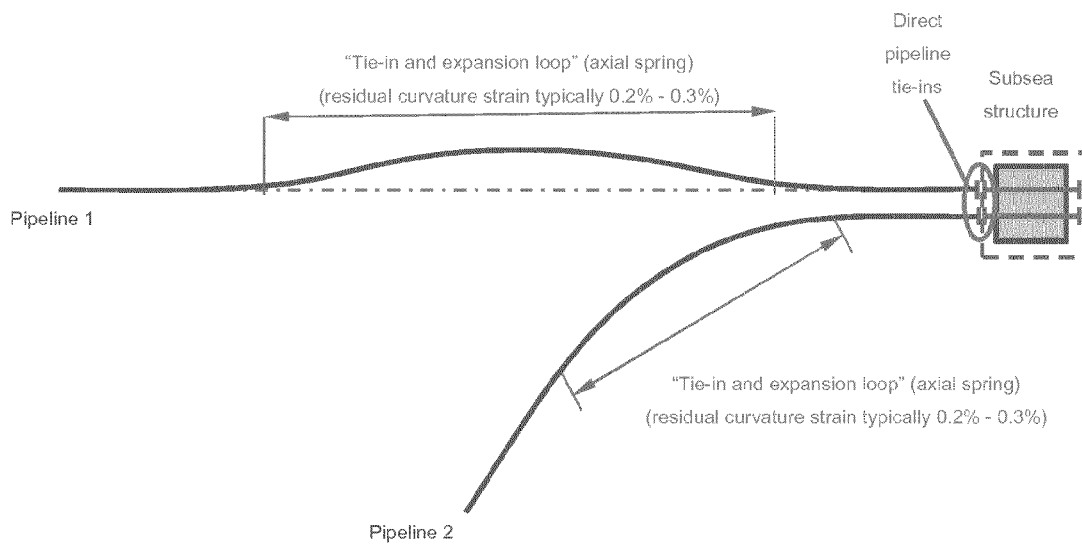
FIG. 8 illustrates schematically a subsea structure with multiple pipelines connected that have a tie-in and thermal expansion loop.

FIG. 8 shows a plan view of a subsea structure with direct tie-in connections to two pipelines with tie-in and thermal expansion loops. For the uppermost pipeline. FIG. 8 illustrates with the broken line the configuration of a first of the pipelines after the tie-in process is completed, whilst the solid line shows the pipeline configuration immediately before tie-in. As shown, the residual curvature strain in the tie-in and thermal expansion loop may be 0.2% to 0.3%. The radius of curvature of the tie-in and thermal expansion loop may be larger than the elastic radius of curvature of the pipeline, meaning that the loop is able to operate as a resilient spring. As a result, the force exerted on the pipeline during the tie-in process causes the tie-in loop to be straightened out. Of course, were the pipeline to be released from the subsea structure, the loop pipeline would spring back and adopt its original shape. The lower pipeline shown in FIG. 8 also incorporates a direct tie-in and thermal expansion loop in the region of the tie-in end.

As a result of the direct tie-in and thermal expansion loops in the region of the tie-in ends of the pipelines, the forces required to pull the pipelines into contact with the respective connectors are greatly reduced. More particularly, the force required to elastically deform the direct tie-in and thermal expansion loop, and thereby stretch the pipeline, is significantly less than the force that would be required to either plastically bend a pipeline into the correct alignment or tension a straight pipeline to increase its length.

A further advantage of providing a direct tie-in and thermal expansion loop in the region of the tie-in end of a pipeline is that this loop also compensates for thermal expansion during use of the pipeline. This is as described in WO02/057674. It may be possible to avoid the need for further expansion loops at midway positions along the pipeline.

Figure 9:
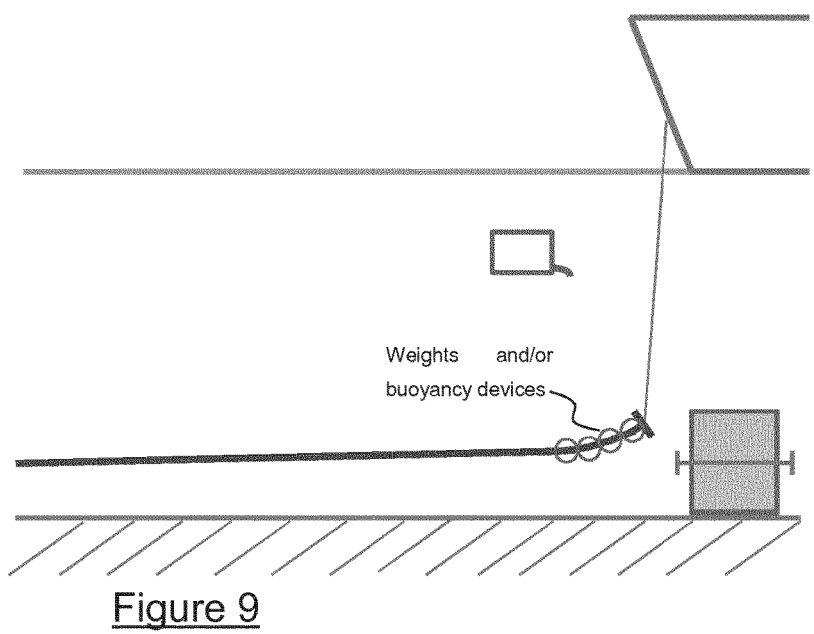
FIG. 9 illustrates schematically the use of weights and/or buoyancy devices to control the orientation of the tie-in and thermal expansion loop and an end of the pipeline during, for example, a direct pull-in direct tie-in installation process.

FIG. 9 illustrates schematically how weights and/or buoyancy devices may be used to control the proper orientation and rotation of the tie-in and expansion loop, if required. The weights and/or buoyancy devices may be installed at or close to the subsea end of the pipeline.

It will be appreciated by the person of skill in the art that various modifications may be made to the above described embodiments without departing from the scope of the present invention.

The invention claimed is:

1. A method of installing a subsea pipeline having a direct tie-in to a subsea structure, the method comprising the steps of:
   during introduction of the pipeline into the sea from a pipe laying vessel, applying a plastic deformation to a region of the pipeline at or close to an end of the pipeline to be tied-in, wherein the plastic deformation creates a radius of curvature in said region of the pipeline when installed that is smaller than the radius of curvature of an adjacent section of the pipeline when installed;
   laying the tie-in end of the pipeline on or close to the seabed; and
   during tie-in, elastically deforming said region by pulling the tie-in end towards the subsea structure so as to apply a tensile force to the pipeline and increase the radius of curvature of said region.

2. The method according to claim 1, wherein said region is located within 200 m of the tie in end of the pipeline.

3. The method according to claim 1, wherein said region is located within 100 m of the tie in end of the pipeline.

4. The method according to claim 1, wherein said step of pulling is achieved using a winch having a winch cable attached to said tie-in end and passing through the subsea structure.

5. The method according to claim 1, wherein said step of pulling is achieved using a winch having a winch cable extending from the laying vessel or a support vessel and being directly connected to said tie-in end.

6. The method according to claim 1, further comprising the steps of:
   performing said tie-in at the surface;
   lowering the tie-in end of the pipeline and the subsea structure to the seabed; and
   performing further laying of the pipeline including pulling the pipeline to cause elastic deformation of said region.

7. The method according to claim 1, further comprising the step of attaching weights and/or buoyancy devices at or close to the tie-in end of the pipeline in order to control the orientation and location of the pipeline.

8. The method according to claim 1, wherein said step of applying a plastic deformation to a region of the pipeline at or close to an end of the pipeline to be tied-in comprises establishing a residual curvature strain of between 0.2% to 0.3%.

9. The method according to claim 1, wherein said pipeline is a steel pipeline.

\* \* \* \* \*